(No Model.)
J. W. CAMPBELL.
TOWEL RACK.
No. 435,133. Patented Aug. 26, 1890.
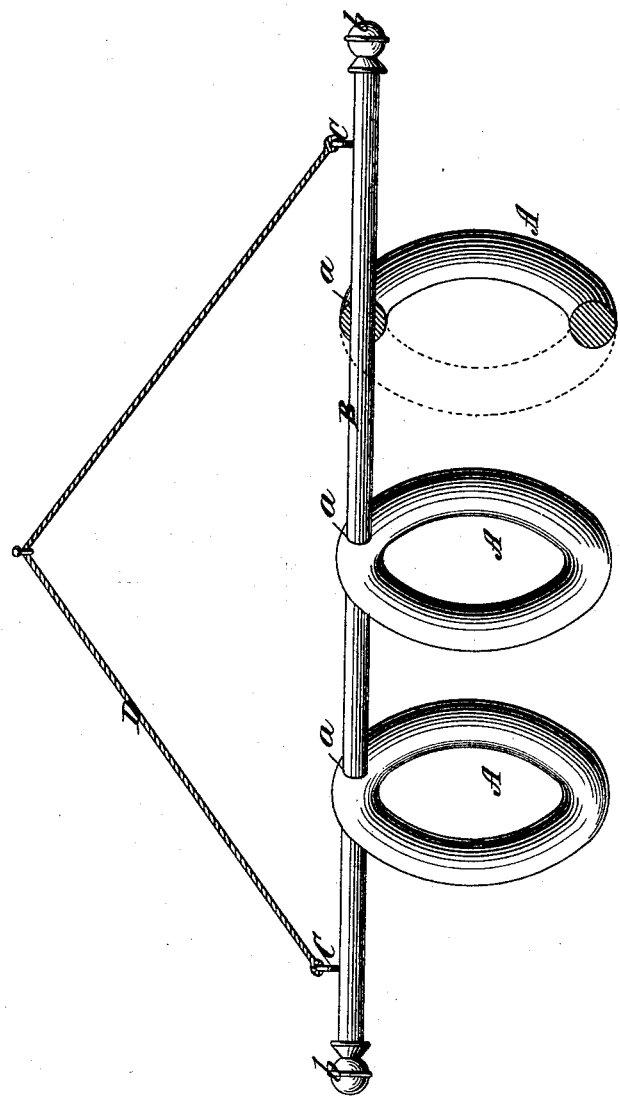
Witnesses:—
D. H. Haywood
Fred T. Haynes
Inventor:—
James W. Campbell
by his attorneys
Brown & Seward

UNITED STATES PATENT OFFICE.

JAMES W. CAMPBELL, OF GERMANTOWN, ASSIGNOR TO FERGUSON BROTHERS, OF NEW YORK, N. Y.

TOWEL-RACK.

SPECIFICATION forming part of Letters Patent No. 435,133, dated August 26, 1890.

Application filed March 25, 1890. Serial No. 345,279. (No model.)

*To all whom it may concern:*

Be it known that I, JAMES W. CAMPBELL, of Germantown, in the county of Columbia and State of New York, have invented a certain new and useful Improvement in Towel-Racks, of which the following is a specification.

The object of my invention is to provide a convenient rack of neat and ornamental appearance, and one which shall consist of few parts and be quite simple and inexpensive.

With these ends in view my invention consists in certain features of construction and combination of parts, as will hereinafter be described, and pointed out in the claims.

The accompanying drawing represents an embodiment of one form of my invention, in which a series of rings are provided with perforations extending through them at an angle to their planes, and by means of such perforations the rings are slid upon a bar and the bar is provided with neatly finished or ornamental ends, and with retaining-points for the ends of a suspending chain or cord.

A A, &c., represent a series of rings. In the present instance three are shown, one of which is broken away to show in section the position of the supporting-bar. Each of the rings is provided with an opening $a$ therethrough between the outer and inner walls of the ring, and in the form herein illustrated. The opening extends at an oblique angle to the plane of the ring, so that when the rings are assembled upon the bar they will necessarily occupy a position oblique to the bar.

The bar is indicated by B, and is of such diameter as to be easily inserted through the openings in the rings. The bar is provided with finished or ornamented ends $b$, and near its ends it is provided with retaining-points C, in the present instance screw-eyes, to which the ends of a suspending chain or cord D are secured.

The rack is preferably made of wood, although it might be made of any other suitable material. Its parts are conveniently assembled by inserting the bar through the openings in the rings before the finished or ornamented tip and screw-eye at one end of the bar are in place, and when the said tip and screw-eye are in position the rings are locked in position on the bar. The rings may be left free to be moved along the bar, or they may be fastened to the bar in any well-known and suitable manner.

In the embodiment of the invention herein shown the rings present their openings partially toward the front in a convenient position for inserting the towel.

What I claim as my invention, and desire to secure by Letters Patent, is—

1. A towel-rack comprising a series of rings having openings therethrough between the outer and inner walls of the ring, a bar passing through said openings and forming a support for the rings, and means for suspending the bar, substantially as set forth.

2. A towel-rack comprising a series of rings having openings therethrough between the outer and inner walls of the rings, the said openings extending at an angle to the plane of the rings, a bar passing through the said openings in the rings, and means for suspending the bar, substantially as set forth.

JAMES W. CAMPBELL.

Witnesses:
FREDK. HAYNES,
LUCIA J. KELLOGG.